: 3,350,197
: FERROSILICON ALLOYS
: Thomas B. Beeton, Daniel J. N. Hoffman, and David J.
: Du Plessis, Pretoria, Transvaal, Republic of South
: Africa, assignors to South African Iron and Steel Industrial Corporation Limited
: No Drawing. Filed June 17, 1964, Ser. No. 375,961
: Claims priority, application Republic of South Africa,
: June 25, 1963, 63/2,823; Dec. 6, 1963, 63/5,541
: 9 Claims. (Cl. 75—122.5)

This invention relates to ferrosilicon alloys.

The suspension of solid particles of ferrosilicon in a liquid medium to produce a high density, low viscosity heavy medium for use in mineral separation, is well known. It is also known that rounded particles with relatively smooth surfaces are particularly advantageous for producing effective heavy media.

Such rounded and smooth particles may be produced by spraying molten metal from the melt, such as by the well-known method of fluid atomization. Alternatively, rounded and smooth particles may be produced by so-called flame spheroidisation in which irregularly shaped, solid metal particles are passed through a high temperature flame to melt them at least at their surfaces, and allowing the particles to pass from the flame into a cooling zone.

In our South African patent specification No. 62/3,265 we disclose a method of producing solid particles for a heavy medium, including the steps of spraying molten material from the melt into discrete solid particles; separating a coarse and a fine fraction of the sprayed particles; comminuting at least part of the separated coarse fraction to a size generally smaller than the separated fine fraction; flame spheroidising at least part of the comminuted particles; and mixing flame spheroidised particles in predetermined proportion with separated fine fraction of the sprayed particles. The sprayed particles are preferably produced by fluid atomization.

For best results, the material from which rounded and smooth sprayed or flame spheroidised solid particles are made, should have the highest possible resistance to corrosion and abrasion, the highest possible surface tension in the molten state and the highest possible specific gravity. Generally speaking, and within limits, roundness of shape and smoothness of surface improves with increasing surface tension.

Also, the particles should not be brittle to such an extent that they fracture easily during normal use, but where flame spheroidised particles are derived from comminuted, sprayed particles should have a brittleness and hardness to permit comminution without undue difficulty. The particles should preferably be magnetic to permit magnetic recovery after use. Apart from their physical characteristics, it is also desirable for the particles to be relatively cheap.

Certain compositions of ferrosilicon are useful for the production of solid particles for heavy media in that such material has a relatively high specific gravity, is corrosion resistant and is magnetic. Also, ferrosilicon is relatively cheap. The corrosion resistance of ferrosilicon particles can be increased by increasing the silicon content. However, due to the relatively low specific gravity of silicon, the resultant specific gravity of the alloy decreases with increasing silicon content. Also, there is an upper limit to the silicon content if the magnetic properties and the surface tension of the alloy are not to be effected adversely. Up to a content of about 15%, the silicon does not affect surface tension and magnetic properties to any appreciable extent, but thereafter both surface tension and the magnetic properties decrease with an increase of silicon until at a content of about 33% the magnetic properties of the alloy are nullified for all practical purposes.

During recent times a demand for more effective mineral separation has called for particles of increasingly high specific gravity and improved shape and surface characteristics. It has been found that plain ferrosilicon does not yield particles of satisfactory quality.

It has been suggested generally that instead of plain ferrosilicon, ferrosilicon alloys containing anti-corrosive additives, such as copper or aluminum, may be used.

A subsequent specific proposal provides a ferrosilicon alloy containing between 10 and 25% silicon and between 0.08 and 0.5% aluminum, with or without the addition of other metals. It is suggested that additional metals can be introduced by adding to a ferrosilicon melt an aluminum alloy containing relatively small portions of one or more of the substances copper, silicon, manganese, chromium, magnesium and iron. There was no suggestion as to the percentages of the additional metals that should be present in the alloy. Although this proposal represents an improvement over ferrosilicon alloys known at the material time, it is still open to improvement.

It is, of course, known to provide various additives to ferrosilicon for widely different applications, that there is a real danger of inconsistent results being obtained. For example, a prior patent specification discloses that it is known that by the addition of a considerable amount of nickel the specific gravity of a ferrosilicon alloy can be increased, but that although nickel itself is ferromagnetic, it adversely affects the magnetic properties of the resultant alloy.

In developing an improved ferrosilicon alloy for the production of solid particles for heavy media, it is not only the various constituents, but also the relative proportions of the constituents that are of vital importance. Also, the question of cost has to be considered for industrial applications.

It is an object of the present invention to provide an improved and relatively cheap ferrosilicon alloy suitable for the production of solid particles of improved characteristics for heavy media.

According to the invention a ferrosilicon alloy contains from 5 to 20% by weight silicon, from 0.2 to 10% by weight chromium, from 0 to 5% by weight uranium, and at least one of the elements nickel in the range 0.2 to 10% by weight and copper in the range 0.2 to 10% by weight, the remainder being substantially all iron with a minimum iron content of 60% by weight, the sum of the silicon and chromium contents not exceeding 21% by weight and the sum of the nickel and copper contents not exceeding 10% by weight.

Although it is preferable for the alloy to contain uranium content may in fact be zero.

The alloy according to the invention has excellent specific gravity, surface tension, magnetic corrosion, abrasion, brittleness and hardness characteristics from the point of view of solid particles for heavy media.

The iron content is important since one or more of the desirable characteristics of the alloy is/are likely to be impaired if the iron content is below 60%.

The silicon in the alloy increases the corrosion resistance of the alloy, but has a detrimental effect on specific gravity. It is preferably for the silicon content to be below 15% from the point of view of magnetic, surface tension and specific gravity characteristics.

The addition of chromium increases the abrasion and corrosion resistance as well as the specific gravity of the alloy, but lowers the surface tension of the alloy in the molten state and is therefore detrimental to the surface and shape characteristics of particles formed from the alloy by spraying from he melt or by flame spheroidisation.

The alloy may contain nickel and/or copper but preferably contains both nickel and copper.

Addition of nickel and/or copper increases the surface tension of the alloy in the molten state and counteracts the detrimenal effect of the chromium in this regard.

Nickel also adds to the abrasion and corrosion resistance as well as the specific gravity of the alloy. However, nickel has a tendency to impair the magnetic properties of the alloy, but the chromium has a corrective influence and tends to counteract this detrimental effect of the nickel.

The copper also adds to the corrosion resistance and specific graviy of the alloy. Although the copper does not add materially to the inherent abrasion resistance of the alloy itself, the beneficial effect of the copper on the surface tension of the alloy enhances the roundness and smoothness of solid particles produced from the alloy by spraying from the melt or by flame spheroidisation. In the result, abrasion of the solid particles in use in a heavy medium is minimized.

The sum of the nickel and copper contents should not exceed 10% by weight otherwise the magnetic properties of the alloy are likely to be impaired.

According to the invention the ferrosilicon alloy may include between 0.01 and 5% by weight uranium.

The addition of uranium increases the corrosion and abrasion resistance, the surface tension and the specific gravity of the alloy. Since the specific gravity of uranium is about 19.0 as compared to a value of 7.8 for iron, even a relatively small quantity of uranium can have a marked effect on the specific gravity of the alloy. It has, however, been found that the corrosion resistance of the alloy is likely to decrease if the uranium content is increased above 5% by weight.

Natural or depleted uranium can be used.

More particularly, the silicon content of the alloy may lie between 10 and 13% by weight.

The chromium content may lie between 1 and 5% by weight.

The nickel content may lie between 0.5 and 2% by weight.

The copper content may lie between 0.2 and 5% by weight.

The uranium content may lie between 0.2 and 1% by weight.

One or more of the constituents of an alloy according to the invention may be present in the relevant restricted range or ranges given above.

In one embodiment of the invention the alloy contains from 10 to 13% by weight silicon, from 1 to 5% by weight chromium, and at least one of the elements nickel in the range 0.5 to 2% by weight and copper in the range 0.2 to 5% by weight, the remainder being substantially all iron.

In another embodiment of he invention the alloy contains from 10 to 13% by weight silicon, from 1 to 5% by weight chromium, from 0.2 to 1% by weight uranium, and at least one of the elements nickel in the range 0.5 to 2% by weight and copper in the range 0.2 to 5% by weight, the remainder being substantially all iron.

In a more specific embodiment of the invention the alloy contains 12.5% by weight silicon, 2% by weight chromium, 1% by weight nickel and 1% by weight copper, the remainder being substantially all iron.

An alloy according to the invention may be produced in any suitable manner as will be clear to a man skilled in the art. It will be appreciated that certain incidental impurities may also be present in the alloy.

In a preferred embodiment of the invention the alloy contains 12.5% by weight silicon, 2% by weight chromium, 1% by weight nickel, 1% by weight copper and ½% by weight uranium, the remainder being substantially all iron.

In one particular method of producing the preferred alloy composition of the previous paragraph, a 75% ferrosilicon and low carbon steel scrap are melted together in an electric arc furnace. Nickel and copper are then added to the melt and allowed to dissolve. Thereafter chromium is added to the melt in the form of ferrochrome.

The resultant melt is tapped at a temperature of about 1500° C. into a ladle and uranium is added to the melt in the ladle in the form of iron-uranium-silicon alloy.

The relative quantities of material used are suitably adjusted as will be clear to a man skilled in the art to provide a ferrosilicon alloy melt in the ladle containing 12.5% by weight silicon, 2% by weight chromium, 1% by weight copper, 1% by weight nickel and ½% by weight uranium, the remainder being substantially all iron.

Rounded and smooth particles may be produced by atomizing the melt in the ladle in any suitable manner, such as for example by the atomization procedure disclosed in our South African patent specification No. 62/3,265. The melt in the ladle should be atomized as soon as possible after the addition of the uranium to minimize oxidation of the latter.

It has been found that atomized solid particles of superior roundness of shape and smoothness of surface having a specific gravity in excess of 7 and which are very resistant to corrosion and abrasion, can be obtained from the preferred alloy composition. The brittleness and hardness of the atomized particles are such that the particles do not fracture easily during normal usage in heavy media, but permit comminution of the particles for subsequent flame spheroidisation without undue difficulty. The particles have good magnetic properties for magnetic recovery after use.

Rounded and smooth particles may be produced from the preferred alloy composition by flame spheroidisation in any suitable manner, such as for example by the procedure disclosed in our South African patent specification No. 62/3,265.

It has also been found that flame spheroidised solid particles of superior roundness of shape and smoothness of surface having good magnetic properties and a specific gravity in excess of 7 and which are resistant to abrasion, corrosion and fracture during normal usage in heavy media can be obtained from the preferred alloy composition.

A heavy medium for mineral separation may be produced by suspending solid particles of the alloy in water or any other suitable liquid.

By suitable blending of solid atomized particles of the preferred composition of the alloy, and solid flame spheroidised particles of the preferred alloy composition which generally are smaller in size than the solid atomized particles, an advantageous size and weight distribution can be obtained to provide an effective heavy medium of very high bulk density, such as in the order of 4 or more.

It will be appreciated that an alloy according to the invention is not restricted for use in the production of solid particles for heavy media, but may be used for other applications where its properties are desirable.

We claim:
1. A ferrosilicon alloy containing from 10 to 13% by weight silicon, from 1 to 5% by weight chromium, from 0 to 5% by weight uranium, and at least one of the elements nickel in the range 0.5 to 2% by weight and copper in the range 0.2 to 10% by weight, the remainder being substantially all iron, and the sum of the nickel and copper contents not exceeding 10% by weight.

2. A ferrosilicon alloy as claimed in claim 1, in which the copper content lies in the range 0.2 to 5% by weight.

3. A ferrosilicon alloy containing from 10 to 13% by weight silicon, from 1 to 5% by weight chromium, and at least one of the elements nickel in the range 0.5 to 2% by weight and copper in the range 0.2 to 5% by weight, the remainder being substantially all iron.

4. A ferrosilicon alloy containing from 10 to 13% by weight silicon, from 1 to 5% by weight chromium, from 0.2 to 1% by weight uranium, and at least one of the elements nickel in the range 0.5 to 2% by weight and copper in the rang 0.2 to 5% by weight, the remainder being substantially all iron.

5. A ferrosilicon alloy containing 12.5% by weight silicon, 2% by weight chromium, 1% by weight nickel, and 1% by weight copper, the remainder being substantially all iron.

6. A ferrosilicon alloy containing 12.5% by weight silicon, 2% by weight chromium, 1% by weight nickel, 1% by weight copper and ½% by weight uranium, the remainder being substantially all iron.

7. Heavy medium solid particles produced from a ferrosilicon alloy containing from 10 to 13% by weight silicon, from 1 to 5% by weight chromium, from 0 to 5% by weight uranium, and at least one of the elements nickel in the range 0.5 to 2% by weight and copper in the range 0.2 to 10% by weight, the remainder being substantially all iron, and the sum of the nickel and copper contents not exceeding 10% by weight.

8. A heavy medium for mineral separation including solid particles produced from a ferrosilicon alloy containing from 10 to 13% by weight silicon, from 1 to 5% by weight chromium, from 0 to 5% by weight uranium, and at least one of the elements nickel in the range 0.5 to 2% by weight and copper in the range 0.2 to 10% by weight, the remainder being substantially all iron, and the sum of the nickel and copper contents not exceeding 10% by weight.

9. A ferrosilicon alloy containing from 5 to 20% by weight silicon, from 0.2 to 10% by weight chromium, from 0.2 to 1% by weight uranium, and at least one of the elements nickel in the range 0.2 to 10% by weight and copper in the range 0.2 to 10% by weight, the remainder being substantially all iron with a minimum iron content of 60% by weight, the sum of the silicon and chromium contents not exceeding 21% by weight and the sum of the nickel and copper contents not exceeding 10% by weight.

References Cited

UNITED STATES PATENTS 2,015,991  10/1935  Breeler _____ 75—128

DAVID L. RECK, *Primary Examiner.*

HYLAND BIZOT, *Examiner.*

P. WEINSTEIN, *Assistant Examiner.*